(No Model.) 2 Sheets—Sheet 1.
H. RICHARDSON.
GRAIN WEIGHING MACHINE.
No. 520,336. Patented May 22, 1894.
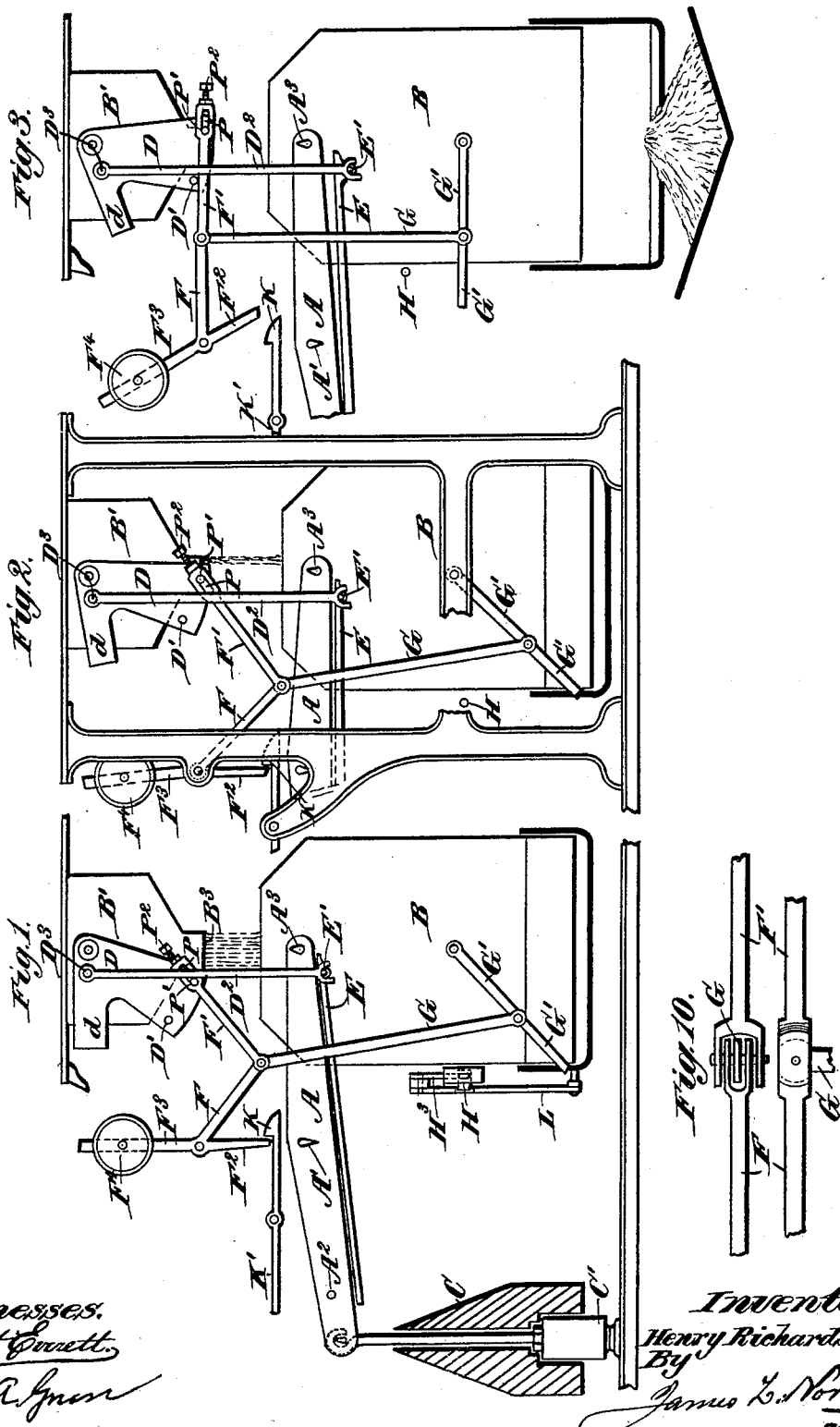
Witnesses.
Robert Everett
Thos. A. Green
Inventor.
Henry Richardson.
By James L. Norris.
Atty.

(No Model.) 2 Sheets—Sheet 2.
H. RICHARDSON.
GRAIN WEIGHING MACHINE.
No. 520,336. Patented May 22, 1894.
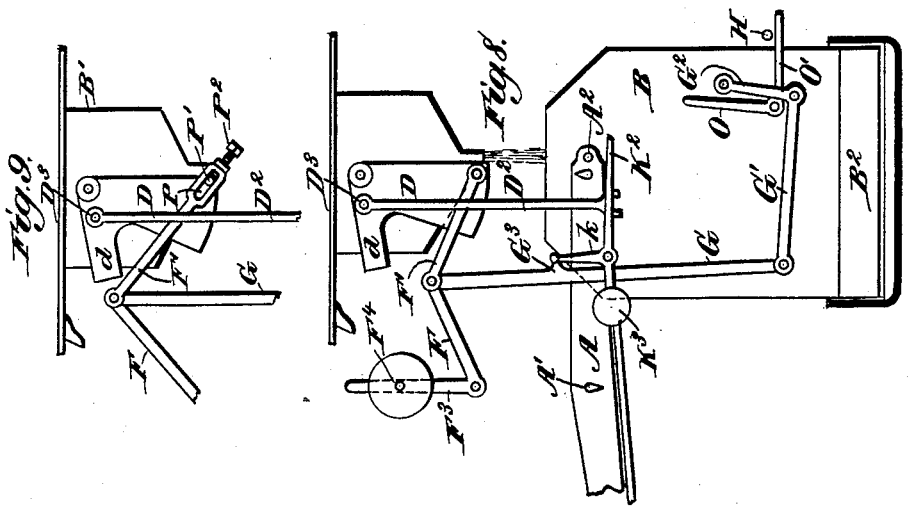
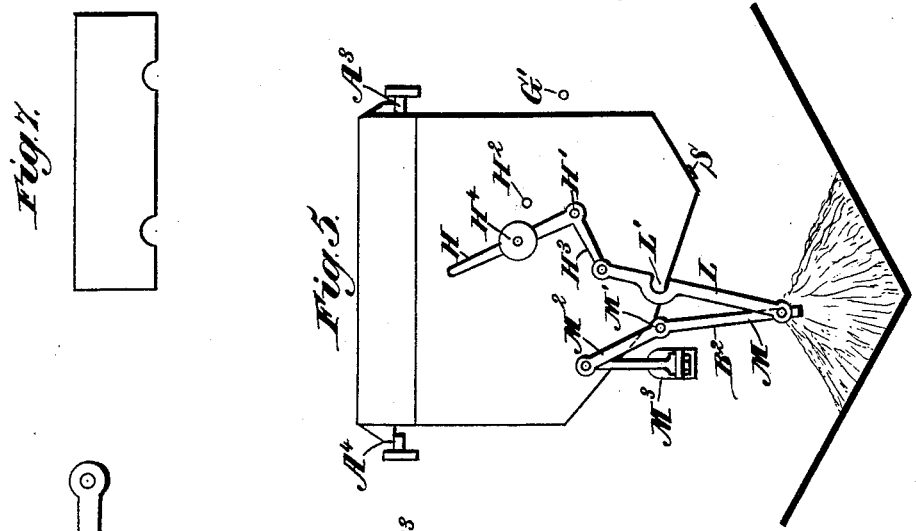
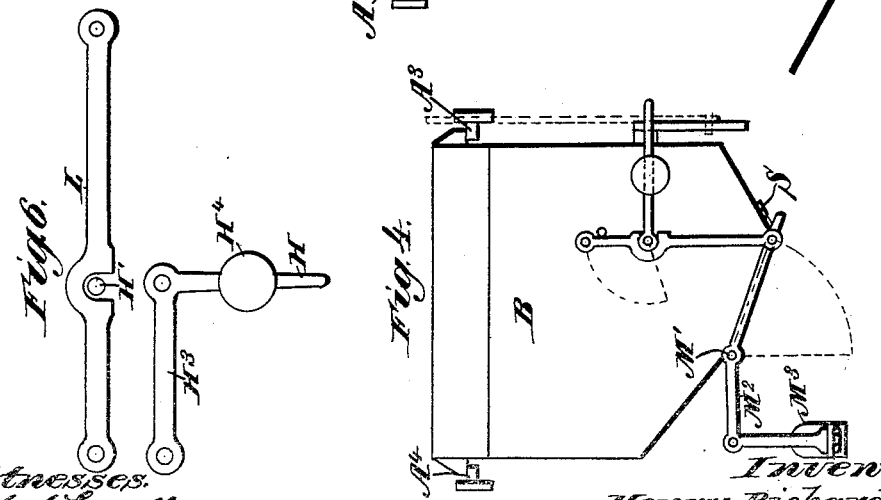
Witnesses:
Inventor:
Henry Richardson
By James L. Norris
Atty.

UNITED STATES PATENT OFFICE.

HENRY RICHARDSON, OF LICHFIELD, ENGLAND.

GRAIN-WEIGHING MACHINE.

SPECIFICATION forming part of Letters Patent No. 520,336, dated May 22, 1894.

Application filed October 26, 1893. Serial No. 489,179. (No model.) Patented in England April 14, 1891, No. 6,345.

*To all whom it may concern:*

Be it known that I, HENRY RICHARDSON, a subject of the Queen of Great Britain, residing at Lichfield, in the county of Stafford, England, have invented new and useful Improvements in Grain-Weighing Machines, (for which I have obtained Letters Patent in Great Britain, No. 6,345, dated April 14, 1891,) of which the following is a specification.

My invention relates to improvements in automatic grain weighing machines, and its object is to construct a simpler and more reliable grain weighing apparatus than has hitherto been produced.

My invention comprises a simplified shutter gear for reducing the rate of flow of grain into the weighing hopper; a simplified cut off gear for closing the grain slide or shutter when the charge of grain has been weighed in; and simple arrangements for controlling the opening and closing of a door or doors in the bottom of the weighing hopper to discharge the grain when weighed and to prevent the further action of the machine when the grain ceases to discharge below the weighing hopper.

Referring to the two accompanying sheets of drawings, which illustrate the application of my invention to a grain weighing machine—

Figure 1 is a side elevation, partly in section, and shows the machine in position ready to receive the grain. The frame is omitted to enable the general action of the operative parts to be more easily distinguished. Fig. 2 is a part side elevation of the grain end of the machine showing the positions of the several parts of the machine when the first grain cut off has taken place. The frame is here indicated. Fig. 3 is another partial side elevation showing the positions when the grain supply is cut off and the door or doors of the weighing hopper are held open by the discharged grain. Fig. 4 is a back view of the weighing hopper showing the door closed and the toggle links locking it. Fig. 5 is a similar view but with the door of the hopper open and shown as held open by the grain heap. Fig. 6 is an enlarged detail view of parts of the door lock. Fig. 7 shows the trickle or dribble holes through which the grain passes to the cut off slide. Figs. 8 and 9 illustrate a modification in the toggle linkage through which the opening of the grain slide is controlled by the closing of the discharge door of the weighing hopper. Fig. 10 shows on an enlarged scale, in plan and side view, the toggle links F F' at their junction with the link G.

Throughout the drawings the same or similar parts are denoted by the same or similar letters.

In the construction of the machine made in accordance with my invention as shown in the drawings, I provide a weighing beam A with a weighing hopper B at one end and weights C C' in a scale pan or poise at the other. The weight C' is preferably suspended from the beam A to balance the hopper B and its attachments. The weight C equals the grain to be weighed into the hopper and is made preferably in conical form externally so as to avoid any accumulation of dust, and dispense with the sheet metal cover commonly employed in such machines to prevent dust falling on the weights.

Above the weighing hopper B, is arranged a swinging or hinging shutter, slide or sluice D, controlling the flow of grain from a large hopper or chute B' containing or passing the grain to be weighed. This shutter or slide D may be constructed in any well known manner, but I prefer it as a curved plate swinging from a center from which the curve is struck as shown in the drawings, and sliding over an oblong aperture $B^3$ that may be fitted with brushes to provide a close joint.

The shutter or slide D is controlled by the movement of the weighing beam A in the following manner: When the weighing hopper B is empty and is in its upper position as shown in Fig. 1, the shutter D is full open, and remains full open until the larger part of the grain charge passes into the hopper, when the hopper end falls through a certain distance, by the action of weights, or a weighted lever or levers, allowed to press against that end of the beam directly, or by an open ended link. Although a separated weighted lever may be applied I prefer to arrange the swinging slide or sluice D in connection with a link $D^2$ to act on the beam as a weighted lever, and for this purpose I weight the end $d$ of the slide D. This causes the link $D^2$, attached to the slide D at $D^3$, to thrust downward against the pin E' which pin is either attached directly to the beam A, or is attached thereto indirectly by way of the spring piece E. So long as the hopper B is empty or contains a charge of grain weighing considerably less than the weight C, then the unbalanced weight of the slide D $d$ and the link $D^2$ is insufficient to overbalance the beam A, but when a certain amount of grain enters the hopper B the free weight of the parts D and $d$ and $D^2$ overbalances the beam and the hopper B falls until the pin P' moving along a slot P, in the toggle F', reaches the point of a regulating screw $P^2$ thus causing the energy exerted by the gate D to bring the toggle linkage into contact with a catch K which holds the free weight of said parts D, $d$ and $D^2$ and prevents them from acting further on the beam A. The weighted lever $d$ partly closes the swinging shutter or slide D and reduces the flow of grain to a trickle in order to accurately obtain the weight necessary to slightly overbalance the beam.

The position of the various parts when the trickle is taking place is clearly shown in Fig. 2. The weight of the lever $d$ and link $D^2$ is now supported against the movable stop or catch K, hereinbefore mentioned, and the beam A is free to weigh a charge accurately. Immediately the weighing hopper B falls by overbalancing the weights or poise C, C', the movement of the beam A, by means of a projecting pin or other contrivance as $A^2$, knocks away the stop or catch K under the weighted lever $F^2$, $F^3$ and the whole weight of the lever $d$ and link $D^2$ is thus brought to bear upon the grain shutter or slide D, together with the free weight of the weight $F^4$ on the lever $F^3$, and at once closes the slide. It is to be noted that as the pin E' falls from under the end of the link $D^2$ for some distance, after the hopper B is fully charged, the pin $A^2$ does not strike the end K' of the catch lever K till it has traveled some distance, the catch lever is therefore struck with some force, and the link $D^2$ and slide D, $d$ acquire some velocity, causing a considerable amount of energy to be accumulated in the weight $F^4$ attached to the lever F, $F^2$, $F^3$. The link G attached between the toggle links F, F' therefore moves up sharply and carries with it the lever G' pivoted to the frame. The movement of the grain shutter and the weighted lever or levers thus causes the end of the lever G' to knock over a toggle gear which is attached to the door or doors $B^2$ at the bottom of the hopper, and permits the weight of the grain to open the door or doors and discharge into any convenient receptacle or receiving hopper. The closed position of the slide D is shown at Fig. 3 where the toggle links F, F', closing the slide or shutter D are shown in their straightened position, the link F' pressing against the stop D' on the slide. In this position although the grain be discharged from the hopper B so that the hopper rises, and with it the hopper end of the beam A, yet the pressure of the pin E' against the end of the link $D^2$ and the pin $D^3$ which connects it to the slide D, does not open the sluice because the toggle links F, F' and the stop D' take the thrust and prevent motion. The use of the spring E attached to the beam A is here apparent, as by its intervention the slide pins and toggle links and pins, are prevented from being unduly strained by the action of the whole of the weight C. Thus while the hopper is discharging, as in Fig. 3, the weight and beam are allowed to return, as in Fig. 1, and thereby avoid the jar and strain, and possibly breakage of toggles, that would ensue, on sudden closing of the hopper door $B^2$, if the pin E' was carried directly on the beam instead of on the spring.

Although only one discharge door $B^2$ is shown in the drawings, yet I may adopt two doors closing toward the middle and hinged or pivoted at the sides. Both doors may close automatically by the action of weights, preferably mounted on prolongations of the doors, and so placed that as the doors open the action of the weights diminishes by moving more and more vertically over the hinges or pivots. One door is made longer than the other and the shorter door is arranged to close first, partly by the fact that the grain remains in contact with the other door longest, and partly to its shortness causing it to oscillate more rapidly and so naturally tend to close sooner than the longer door. The longer door by closing last fits partly over the other and so renders the weighing hopper grain tight.

As shown fully at Figs. 4 and 5 a toggle linkage is attached to one side of the weighing hopper and one door is provided, and a prolongation $M^2$ of one of the toggle links M is weighted by a weight $M^3$ so that when the door $B^2$ closes, the links $H^3$ L swing over the pivoting center H' in the side of the hopper B and press against a stop $H^2$ and also against the center H'. The weight of the grain in the weighing hopper is then powerless to open the door until the toggle links $H^3$ and L are pushed or knocked over, and this is done by the movement of the weighted lever herein referred to, or by the movement of the grain shutter or slide communicated through the link G and lever G', the lever G' being arranged to strike the end of the lever arm H connected to the link or lever $H^3$.

As shown in Figs. 4 and 5, the door $B^2$ is swung on an axis M' at or near right angles to the line of the knife edges $A^3$, $A^4$ upon which the weighted hopper B is suspended. It will be observed that the hopper B is suspended near its upper end from the knife edges $A^3$ $A^4$ which, together with their arrangement at right angles to the axis of the hopper door, gives a substantial advantage in preventing the vibration of the hopper B on the knife edges due to the swinging of the door $B^2$ and the discharge of the grain. In Fig. 4 the door $B^2$ in the bottom of the hopper B is shown closed; its edge is covered by the lever M, but it is indicated in dotted lines. In Fig. 5 the door is shown as open, and in Fig. 6 the toggle links or levers H, H³ and L are shown on a larger scale. The bell crank lever H, H³ pivots at the pin H' fixed to the side of the hopper B and its end H³ connects to the link L, while the link L connects to the lever M pivoting with the door B² from the center or axis M'. The lever M extends back to M², and from the extension M² depends the pivotally supported weight M³. The weight M³ is so arranged that when the door B² is open, as shown in Fig. 5, its leverage is small, but when the door is closed, as in Fig. 4 its leverage is at its maximum. When the hopper B discharges, the beam A at once raises it, and through the intervention of the spring E presses against the shutter D and link D². The rise of the hopper, however, does not open the grain slide, as this depends upon the closing of the hopper door or doors. The toggle linkage F, F' prevents the slide D from being opened till the linkage is pulled down past the center. When the door B² closes, the end of one of the toggle links H³, L, that is the end H, strikes a projection from the toggle linkage F, F' which, as hereinbefore described, is arranged to hold the grain slide or shutter D closed against the action of a weight, which weight as shown in the drawings is the weight C. When the projection of the lever H from the door-toggles strikes the lever G' then the links F, F' are moved off the dead center, being pulled down by the link G which is connected to the lever G', and the weight C is free to open the grain shutter or slide through the intervention of the spring piece E. The grain then flows into the weighing hopper B and the machine again makes another weighing, and continues to weigh and discharge grain into a receiving hopper until the grain no longer flows away from the hopper, by accumulating below. When this occurs although the hopper B may rise on discharging, yet the door B², or doors, or one of the doors, is prevented from closing by the heap of grain as shown in Figs. 3 and 5, and thus the toggle links holding the grain shutter or slide D closed, are not knocked over their centers, and so the shutter D remains closed till the door or doors is, or are, permitted to close again by the removal of the grain preventing their action. When the door B² closes the toggle links F, F' are knocked over the dead center and the weight at once opens the grain slide or shutter. It will be observed that only a small amount of pressure is required against the tip of the opened door B² in order to keep it open, as in Fig. 5, owing to the power exerted by the weight M³ being minimized by the position of said weight, nearly over the approximately perpendicular line of the opened door. A weight H⁴ on the arm H of the bell crank lever H H³ also tends to keep open the door. It will thus be seen that owing to the manner of hinging the door B² under the influence of the weights M³ H⁴ a small accumulation of grain at the tip of the door is able to keep the door open and thereby stop the machine automatically until the accumulation of grain has passed away or been removed. One of the objections incident to many weighing machines of this general character is the action of the shake or vibration of the hopper in quickly wearing away the knife edges and in making the introduction of guides or stay rods necessary in order to lessen the vibration. Such guides and steadies or stay rods considerably affect the accuracy of the weighings, and a beam or scale arranged to operate without them has a great advantage in accuracy as well as in economy and simplicity of construction. This advantage is readily secured by hinging the hopper door B² on an axis at or near right angles to the knife edges A³ A⁴ upon which the weighing hopper is suspended at or near its upper end, as shown in Figs. 4 and 5, the relative position of the beam A and door B² being such that the door opens or tips toward the side of the machine, and parallel with the beam, thereby obviating wear on the delicate knife edges.

In Fig. 8 I have shown a modification of the hereinbefore described arrangement in which the toggle links F, F' open the sluice or slide D by rising above, instead of falling under the center. As shown, the slide is in the position to give a trickle. The link D² and the lever d fall with the falling beam till a projection G³ on the link G strikes the projection k of a catch or stop tumbler lever K² having a weight K³ on one end. When, by the trickle, sufficient grain has been added to overbalance the beam A, then the pin A² on the beam strikes the lever K² and by knocking away the projection k from under the stop G³ allows the link G to fall and close the slide D, by straightening the toggle links F, F'. The bell crank lever G', G² attached to the end of the link G and pivoting from the machine frame is thus moved, and its end G² strikes a lever O, O' pivoted to the weighing hopper B and thus operates the lever H opening the toggle or dead center lock of the door B² thereby allowing the discharge of the grain.

Instead of the toggle gear hereinbefore described, catch gear may be used, and other mechanical equivalents may be adopted, springs may be applied to close the hopper doors for example, and springs may be used to bring about the reduced opening of the grain slide or shutter. To reduce the time of the action of the trickle, graduated friction may be applied to the weighted lever to cause it to act more suddenly.

The position of the weight F⁴ on the lever F³ is capable of adjustment, and it may be moved to change the time occupied in the weighings as it determines the rate of movement of the slide D.

Brushes S may be applied to the hopper door to keep it grain tight.

As shown in Figs. 1, 2, 3 and 9, I prefer to provide the outer end of the toggle link F' with a slot P fitting over a pin P' on the slide D and arranged to allow the shutter or slide D to close to the trickle position independently of the toggle.

In the end of the link F' is an adjustable screw $P^2$ that can be adjusted in or out to vary the extent of movement that may be given to the slide. When the toggle is set in action the length of the slot P is traveled before the slide D is finally closed, so that considerable energy is acquired.

In the form of toggle linkage shown in Figs. 8 and 9 where the toggle is kept supported in its high position by the projection $k$ on the tumbler lever $K^2$ the pin P' on the slide D is allowed to move down the slot P till it reaches the screw $P^2$ and so causes the dribble to run as shown in Fig. 2. One advantage of this construction is that the whole weight of the released slide-toggle acts at once to release the door-toggle and thus permits the bell crank O O', Fig. 8, to be dispensed with, if desired. It is obvious, however, that in either form of linkage the link F' may be directly connected to the slide D, as shown in Fig. 8.

What I claim as my invention is—

1. In an automatic weighing machine, the combination of the beam A having one end provided with knife edges $A^3$ $A^4$, the weighing hopper B suspended from said knife edges and provided at the bottom with a swinging discharge door $B^2$ having its pivotal axis at a right angle to the knife edges, the lever M $M^2$ attached to one side edge of the door and extended beyond its pivotal axis, the weight $M^3$ pivotally suspended from the extended end of said lever and adapted to occupy a position nearly over the perpendicular line of the opened door, the weighted bell crank lever H $H^3$, the link L connecting said bell crank to the weighted lever M $M^2$, a tripping device for the bell crank lever, an automatic grain slide for controlling the feed of grain to the weighing hopper, and toggle linkage connecting the grain slide and tripping device, substantially as described.

2. In an automatic weighing machine, the combination with the beam A and the weighing hopper B suspended from the beam and provided with a swinging discharge door $B^2$, of the grain slide D, the lever M $M^2$ attached to the door $B^2$ and provided with weight $M^3$, the weighted bell crank lever H $H^3$ attached to the weighing hopper, the link L connecting said bell crank to the lever M $M^2$, a lever G' for tripping the bell crank H $H^3$, toggle linkage F F' G connecting said lever G' with the grain slide, and a catch for said toggle linkage, substantially as described.

3. In an automatic weighing machine, the combination of the beam A, the weighing hopper B suspended from the beam and provided with door $B^2$, the hopper B' provided with grain slide D, the spring E attached to the beam, the link $D^2$ attached to the grain slide and adapted to bear on said spring, toggle links and levers connected with the grain slide, a catch controlled from the beam and adapted to engage said toggle links to hold the grain slide partly open, and weighted locking levers connected with the discharge door of the hopper and adapted to be tripped by the released toggle linkage of the grain slide, whereby the grain slide is closed and the discharge door of the hopper opened simultaneously with the balancing of the beam, substantially as described.

4. In an automatic weighing machine, the combination of the beam A, the weighing hopper B suspended from the beam and provided with a swinging door $B^2$, the feed hopper B' provided with the swinging grain slide D, the toggle links F F' one of which is provided with a slot P engaging a pin P' on the grain slide, the link G and lever G', and locking mechanism connected with the discharge door of the hopper and adapted to be tripped by said lever, substantially as described.

5. In a weighing machine, the combination of the beam A having weights at one end and at its other end provided with the weighing hopper B having a door $B^2$, the hopper B', the swinging grain slide or shutter D, the link $D^2$ connecting the shutter and beam, the toggle links F F' the levers G G' and $F^2$ $F^3$, the weight $F^4$ and the catch K, substantially as shown and described.

6. In a weighing machine, the combination with a beam carrying weights at one end, a weighing hopper connected to the other end of said beam and provided with a pivoted door, a weighted bell crank lever connected to and closing said door, a tripping device for said bell crank lever, a feed hopper, a swinging shutter controlling the feed from said hopper and connected to the beam, and toggle mechanism connecting said shutter and tripping device, substantially as described.

In testimony whereof I have hereunto set my hand in presence of two subscribing witnesses.

HENRY RICHARDSON.

Witnesses:
WM. B. STEWART,
S. D. BREWER.